United States Patent
Melaibari et al.

(10) Patent No.: US 11,207,867 B1
(45) Date of Patent: Dec. 28, 2021

(54) BIO-INSPIRED COMPOSITE LAMINATE DESIGN WITH HIGH OUT-OF-PLANE STRENGTH AND DUCTILITY

(71) Applicant: KING ABDULAZIZ UNIVERSITY, Jeddah (SA)

(72) Inventors: Ammar Abdulghani Melaibari, Jeddah (SA); Ahmed Wagih Abdallah abdelhady, Jeddah (SA); Muhammad Adnan Basha, Jeddah (SA); Mohamed abdel Moniem Eltaher, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/109,779

(22) Filed: Dec. 2, 2020

(51) Int. Cl.
| | |
|---|---|
| *B32B 37/00* | (2006.01) |
| *B32B 7/05* | (2019.01) |
| *B32B 19/02* | (2006.01) |
| *B32B 19/04* | (2006.01) |
| *B32B 5/12* | (2006.01) |

(52) U.S. Cl.
CPC .......... *B32B 7/05* (2019.01); *B32B 5/12* (2013.01); *B32B 19/02* (2013.01); *B32B 19/04* (2013.01); *B32B 37/0076* (2013.01); *B32B 2260/046* (2013.01); *B32B 2262/106* (2013.01); *B32B 2305/076* (2013.01); *B32B 2327/18* (2013.01); *B32B 2363/00* (2013.01)

(58) Field of Classification Search
CPC ...................................................... B32B 37/00
See application file for complete search history.

(56) References Cited

U.S. PATENT DOCUMENTS

| | | | | |
|---|---|---|---|---|
| 5,061,545 A | * | 10/1991 | Li | B29C 70/504 |
| | | | | 428/195.1 |
| 9,562,744 B2 | * | 2/2017 | Wagner | B32B 5/024 |
| 2017/0335079 A1 | * | 11/2017 | Pol | B29C 70/887 |
| 2018/0326676 A1 | * | 11/2018 | Taketa | B29C 70/205 |

* cited by examiner

*Primary Examiner* — Andrew T Piziali
(74) *Attorney, Agent, or Firm* — W&C IP (57) ABSTRACT

Bio-inspired carbon fiber reinforced polymer (CFRP) composite laminates are provided. The CFRP laminates display high out-of-plane strength and ductility due to the incorporation of defects (e.g. areas of delamination) which are purposefully introduced into the laminate layers.

17 Claims, 11 Drawing Sheets
(11 of 11 Drawing Sheet(s) Filed in Color)

BIO-INSPIRED COMPOSITE LAMINATE DESIGN WITH HIGH OUT-OF-PLANE STRENGTH AND DUCTILITY

FIELD OF THE INVENTION

The invention generally relates to a bio-inspired carbon fiber reinforced polymer (CFRP) composite laminate with improved out-of-plane strength and ductility. In particular, the invention provides CFRP composite laminates by including defects (e.g. areas of delamination) which are purposefully introduced between plies of the laminates to control and redirect the crack propagation and increasing the ductility.

BACKGROUND

Low failure strain and catastrophic failure are the most critical challenges of carbon fiber reinforced polymer (CFRP) composite laminates. Due to its beneficial characteristics such as stability, lightweight and high stiffness, Carbon Fiber-Reinforced Polymer (CFRP) composites have been broadly utilized for many engineering applications (e.g., aerospace and marine structures, automobiles, satellites, sporting goods, etc.). Despite these advantages, relatively low strain at failure and catastrophic failure without any warning signs before complete failure are sensitive limitations. These limitations prevent designers from taking advantage of the benefits of the outstanding strength and stiffness of CFRP composites and limit their application in the systems where the load conditions are not fully predictable and catastrophic failure can cause a disaster. Moreover, the strength and stiffness of CFRP composites are influenced by cracks and delamination defects which may result from imperfect manufacturing processes and/or during the operational life of the laminate, Amaro et al. (2011). For example, the compressive residual strength can be reduced up to 60% due to impact loading which occurs through in-service, De Moura and Marques (2002). Therefore, composites with improved failure strain and which show warning signs prior to complete failure are urgently needed, allowing their application in a wide variety of primary structures.

SUMMARY

Novel bio-inspired carbon fiber reinforced polymer (CFRP) composite laminates with improved flexural responses are disclosed. The structure of the laminates is based on biological inspiration in that delaminations are embedded between plies at different thickness positions (depths) of the laminate during the lamination process. The flexural properties of the laminates have been characterized and evaluated using a three-point bending test. The different damage modes and their sequences were identified using microcomputed tomography and compared to conventional composite laminates. Experimental results showed that the flexural properties of the bio-inspired composites can be tailored by changing the through-the-thickness delamination positions and sizes. It was observed that the strength, failure strain and energy absorption ability of the optimized bio-inspired laminates, e.g. with 10 mm delamination diameter introduced at the interface nearest to the surface, are improved by 11.9%, 208% and 288.1%, respectively, compared to laminates which do not include the delaminations. Moreover, these bio-inspired composites showed a progressive damage mode with a pseudo-ductility response: a slight degradation of the strength first occurred and was followed by increased strain while sustaining the same strength, up to a failure strain two times greater than the initiation strain. Therefore, the proposed bio-inspired laminates showed a "metal-like" failure that provides a warning alert before the final failure, making them applicable in many industrial applications.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of this specification, illustrate embodiments of the invention and, together with a general description of the invention given above, and the detailed description given below, serve to explain the invention.

DESCRIPTION

Disclosed herein are novel bio-inspired carbon fiber reinforced polymer (CFRP) composite laminates with improved flexural responses and strength. During the production process, one or more defects in the form of areas of delamination are introduced at various positions within the layers (plies, laminae) of the laminate. Due to the defects, the resulting laminates exhibit superior strength, failure strain and energy absorption ability compared to conventional laminates. The flexural properties of the laminates can be advantageously tailored by changing the positioning and size of the areas of delamination, e.g. to produce laminates with pseudo-ductile properties, high flexural strength. For example, laminates can be tailored and constructed so that delamination propagation starts at an interface near a likely location or locations of impact, thereby preventing or slowing the onset of delaminations at other locations. This generally involves positioning one or more defects near putative areas of impact.

The CFRP composite laminates disclosed herein are distinguished from conventional composite laminates which may accidentally contain areas of delamination between layers e.g. due to imperfections introduced during manufacturing, or which may be introduced e.g. during use when layers split due to impact, in that in the disclosed laminates, the areas of delamination are purposefully designed to have predetermined (planned) sizes, depths, etc. In addition, voids of a predetermined number are purposefully introduced at predetermined locations (e.g. at various through the thickness depths and at various predicted or likely locations of impact) of the laminate. In other words, the characteristics and positioning of the voids are not random or adventitious but are intentional. In some aspects, a defect (or defects) is/are positioned at an interface of the plies near or as near as possible to a likely point of impact when the laminate is in use.

Components of the Laminates

Generally, tapes of carbon fibers impregnated with a resin matrix (prepreg tapes) are used to manufacture the laminates. Typically, the tapes are unidirectional, i.e. all fibers run in the same direction with, for example, 57% fiber volume fraction. The tapes can be any of a wide variety of weights and thicknesses to meet the manufacturing requirements for the desired end-product.

Examples of thermosetting or thermoplastic resins that may be used in the tapes include but are not limited to: epoxy, cyanate ester, polyimide, bismaleimide (BMI), vinyl ester resins (which are pre-accelerated with amine accelerator or cobalt), polyester, and nylon. These resins may include monomers, oligomers, and/or polymers.

The fibers used in the laminates may vary and include but are not limited to: carbon fibers, glass fibers, basalt fibers, aramid fibers, and natural fibers, and mixtures thereof.

Prepregs that may be used in the practice of this invention are available from a variety of commercial sources including Toray, Rockwest Composites, TCR Composites, NTPT, Chomarate, etc.

In some aspects, the fibers are carbon fibers, which may be turbostratic or graphitic, depending on their origin, or hybrids thereof. The carbon fibers used may be of various types such as polyacrylonitrile-based carbon fibers, pitch-based carbon fibers, rayon-based carbon fibers, etc. Among them, polyacrylonitrile-based carbon fibers may be preferred because they provide high-strength carbon fibers. The fibers may also be functionalized. The content of the carbon fibers in the prepreg is preferably in the range of 25 to 80% by volume and is usually in the range of 40 to 70% by volume for aerospace and automotive applications.

The prepreg tapes that are employed may be any of several weave types, depending on the production goal. For example, plain, twill, satin, fish, spread tow, braids, unidirectional weave and custom weaves may be used.

The thickness of the prepreg is preferably from about 0.02 to 1.0 mm. As the thickness becomes 0.02 mm or more, handling for layering becomes easier, which is preferable. On the other hand, as the thickness becomes 1 mm or less, the impregnation with the resin becomes favorable, which is preferable. The thickness is preferably from about 0.05 to 0.5 mm, such as about 0.25 mm.

In some aspects, the prepreg tapes that are used are unidirectional (UD) carbon/epoxy tapes.

Methods of Making the Laminates

Generally, the laminates are made using any available standard methodology, except for the important feature that "defects" are purposefully introduced during the manufacturing process.

The layup of the prepregs may be by hand or may be mechanized, or a combination thereof. Many combinations of stack sequences may be employed when manufacturing the laminates, e.g. cross-ply, isotropic, quasi-isotropic, and anisotropic, etc. The angles generally vary e.g. from 0° to 90°, and may be the same or different between the layers of the laminate Exemplary angles include but are not limited to: 0°, 45°, 36, 72 (either + or −), 90°, etc.

During layup, at least one substance that is not fusible with the resin (i.e. a defect-inducing substance or material) is introduced into at least one area on at least one layer of prepregs. In other words, the at least one substance is placed so as to be located in between two layers of the stacked prepregs in at least one location. The substance that is inserted typically displays very low, i.e. near zero adhesion with the resin. Thus, during lamination, the areas covered by the substance are not fused and a gap or hole (defect) is left between layers of the laminate (this being referred to as a "delamination"—the invention contemplates the use of one or more delimitations at various z locations within a composite formed from a multi-ply stack of prepregs). Single or multiple defects may be present. The substance may be liquid, semi-solid or solid, and may be introduced by any convenient method suitable to its form, e.g. by dropping onto a layer before the addition of a subsequent layer during layup, injection into or between layers, placing a thin slice of a solid between layers, etc. The shape of the area may be controlled (e.g. by etching a pattern, or by the predictable spreading properties of a drop of the substance, etc.) or the shape may be random. Further, the area may be of any suitable size to cause the desired effects in the final product. The substances that are used and the areas thereof may be uniform throughout the laminate, or a variety of types of different substances and a variety of different shapes and sizes may be present. Generally, it is preferred to control the shape (e.g. as circular, ovoid, rectangular, etc.) and to place a known quantity of the substance at known locations within the stack. For shapes with a major and minor axis, the orientation of an axis may be aligned with or against the ply or at an angle to the ply.

With respect to positioning of the defects, as used herein, a position may be referred to using three-dimensional x, y, z coordinates, so that the x-y plane refers to the surface area of e.g. a flat panel of laminate while the z direction refers to the depth (through the thickness) of a composite. The defects described herein are purposefully introduced at preselected areas that can be identified by their corresponding x, y, z coordinates. For example, a plurality of defects may be introduced at different x, y positions but at the same depth (z dimension); or conversely, a plurality of defects may be introduced at the same x, y position of a laminate but at different depths (z dimensions) throughout the laminate. For laminates that are not planar, those of skill in the art are aware of adaptations of this nomenclature that can be used, e.g. z can refer to depth from a surface.

The thickness of non-adhesive material that is introduced is generally in the range of from about 1 to about 30 µm and the size of the area that will remain delaminated is dependent on the plate size ranging from 10 to 30% of the plate area.

Examples of substances that may be used to introduce defects include but are not limited to: polytetrafluoroethylene (PTFE), teflon, wax, lubricant oils, etc.

Once the prepregs and the defect-inducing substances are in place, heat and pressure are applied to melt the resins and fuse the layers of prepregs together, i.e. to densify and coalesce the layers (except that this does not occur at the areas containing the non-fusible substance). In some aspects, a hot press technique is used in which the layered prepregs are subject to a temperature ranging from about 100 to about 200° C. and a pressure ranging from about 2 to about 10 bar. Particularly for the current laminates, 180° C. and 7 bars are used as processing temperature and pressure, respectively. However, other methods are known, e.g. the autoclave method.

Following lamination, the composites are generally cured, e.g. by exposure to high temperature and pressure for an extended period of time. The curing temperature is typically in the range of from about 100° C. or higher, e.g. from about 100° C. to 250° C., such as from about 120° C. to 210° C. In some aspects, the temperature is 180° C. The elevated temperature is maintained, e.g. for about 1-5 hours, such as about 1, 2, 3, 4, or 5 hours, and then the laminates are cooled and ready for further processing into products. The temperature and pressure applied should be sufficient to cause a thermoset to be formed from the impregnating monomers or oligomers, but not at the pre-selected x, y, z coordinates of the defect inducing substance. The defect inducing substance may remain in place, or be disintegrated by the high temperatures applied.

In some aspects, the laminates are formed as sheets or panels. In other aspects, the laminate is molded during production. A method for use in obtaining a molded article from a prepreg includes, for example, stacking a suitable number of pieces of the prepreg in which areas of delamination have been introduced and then placing the stack in a mold which has been heated in advance to from about 110° C. to 160° C. Mold clamping is then performed e.g. with a pressure molding device to shape the prepreg, maintaining a molding pressure of e.g. from about 1 to 10 bar to cure the prepreg and thereby obtain a molded article. In some aspects, the production method includes performing the thermal compression molding in a mold with a share edge structure at a mold temperature of from about 120° C. to 160° C. under a molding pressure maintained at from about 1 to 8 bar for a suitable time period, for example, for about 1 to 2 minutes per 1 mm thickness of the molded article.

Other prepreg resins and conditions for manufacturing laminates therefrom are described, for example, in issued U.S. Pat. Nos. 10,723,875; 10,829,603; 10,815,390; 10,815,349; 10,793,690; 10,774,173; and 10,590,232, the complete contents of each of which are hereby incorporated by reference in entirety.

The resulting laminates may be of any desired thickness to fulfill the intended use.

Uses of the Composites

The CFRP composite laminates that are disclosed herein can be utilized in and for a wide variety of recreation, infrastructure, industrial and medical applications, examples of which include but are not limited to: motorsport vehicles, space travel vehicles and supplies, sports equipment, boats, orthopedic technology (e.g. in orthotics and prosthetics), electrical engineering (e.g. as an "intermediate layer" in multilayer circuit boards and as insulating material for electrical machines and transformers); rotor blades in wind turbines, and a host of others.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLES

Experimental Procedure
Sample Manufacturing

Unidirectional (UD) tape prepreg carbon/epoxy was used to manufacture CFRP samples with cross ply stack sequence $[0/90]_{2s}$. The ply thickness of the prepreg was 0.25 mm resulting in a laminate with 2 mm global thickness. A hand lay-up technique followed by hot pressing was used to manufacture plates of 400×400 $mm^2$. After lamination, the plates were compressed between two steel plates under 8 bars of pressure. The two steel plates were heated to 180° C. with 3° C./min heating rate. The plates were kept under these curing conditions for 2 h and then cooled. During the cooling cycle, the steel plates were cooled down to 25° C. with a 3° C./min cooling rate under the same pressure. This manufacturing procedure was followed for the baseline laminates and also for the bio-inspired laminates.

Figure 1A:
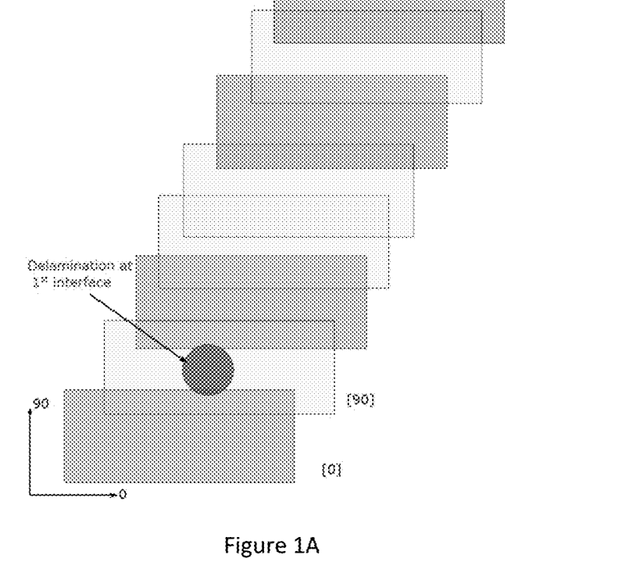
FIGS. 1A and 1B. Schematic drawing of bio-inspired thin-composite laminates. A, circular delamination; B, multiple elliptical delaminations.
Figure 1B:
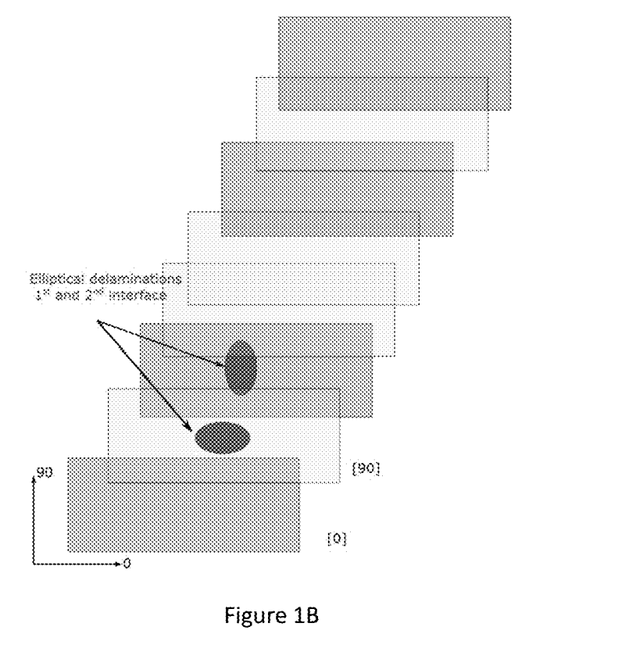

For the bio-inspired laminates, artificial delaminations at different locations through the sample thickness were generated as shown in FIG. 1. During the lamination process, a thin (10 μm) film of polytetrafluoroethylene (PTFE) was positioned so as to create circular (20 & 10 mm delamination diameter) and elliptical (20 mm delamination major dimension) areas of delamination embedded inside the laminates. For the elliptically shaped delaminations, the delamination major axis was aligned with the ply below the delamination. The samples were named based on the through the thickness (depth) of the delamination position. Starting from the interface most distant from the indenter during testing (see FIG. 2), that first interface was denominated L01. For samples with multiple delaminations, the sample was denominated following the same procedure. For example, a sample with delaminations at interfaces 1 and 2 is an L12 laminate. The control, conventional laminate with no defects was named L00.

After curing, 130×50 $mm^2$ samples were cut from the plates using water jet; the major dimension 130 $mm^2$ aligned with the 0 direction of the laminate. At least three samples were tested for each configuration. For some configurations, an extra sample was tested up to certain strain level to observe the damage associated with critical strain/stress changes.

Test Procedure

Figure 2:
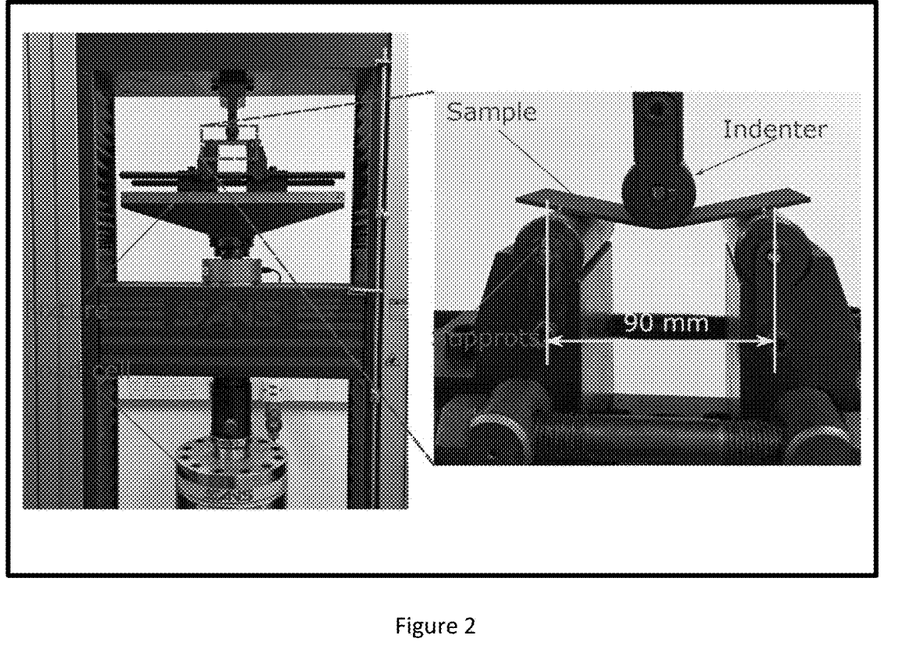
FIG. 2. Three-point bending test setup.

The three-point bending test was used to characterize the flexural properties of the bio-inspired composite laminates. FIG. 2 shows the test setup and indicates the global dimensions. The test was performed under displacement control with 1 mm/min loading rate to meet quasi-static testing conditions. The supports had a span length of 90 mm and the indenter was made of stainless-steel and had a 15 mm radius. The load and displacement were recorded directly from the machine with 10 reads/sec. The energy dissipated during a flexural test was computed as the area under the load-displacement curve.

Computed Tomography Inspections

An X-ray micro-computed tomography (μ-CT) system (Nikon X-TEK XT-H225) was used to identify internal damage modes in the tested specimens. Prior to inspections, samples were submerged in contrast agent for 10 min under vacuum to increase the contrast between the phases of internal damage. The parameters set in the μ-CT system were 140 kV voltage, 130 μA intensity, 250 ms exposure time, 11.27 μm voxel size and 30 mm field of view. In all inspected specimens, the machine acquired 2001 projections during the 360° rotation. The obtained projections were reconstructed using CT Pro 3D. Finally, the obtained reconstructed images were analyzed using Avizo software.

Results and Discussion

FIGS. 3A-D show the stress-strain curves of three samples tested for each of the baseline (control) laminate and three different bio-inspired laminate configurations (L02, L04, and L07). The results revealed the excellent reproducibility of the test. The baseline laminate, L00, showed the conventional bending response of CFRP laminates, where linear stress increases with increasing applied strain up to certain stress level, ~900 MPa, at which nonlinearity in the response occurs. This nonlinearity occurs due to the initiation and propagation of matrix cracks at the upper layers and lower layers due to the high shear and tensile stresses caused by contact and bending, respectively, Wagih et al. (2016a). This nonlinearity stage is very small compared to a linear stage. The nonlinearity stage extends up to the laminate flexural strength (~950 MPa), due to the lower ability of matrix cracking to dissipate energy. After that, a large stress drop occurs caused by the catastrophic failure of fibers. The bio-inspired composites L02 and L04 showed similar trends as those observed for the baseline laminate. However, the failure strain was larger than the baseline laminate for both configurations. Moreover, the flexural strength of L02 is larger than that of the baseline laminate while L04 shows almost the same flexural strength.

Figure 3A:
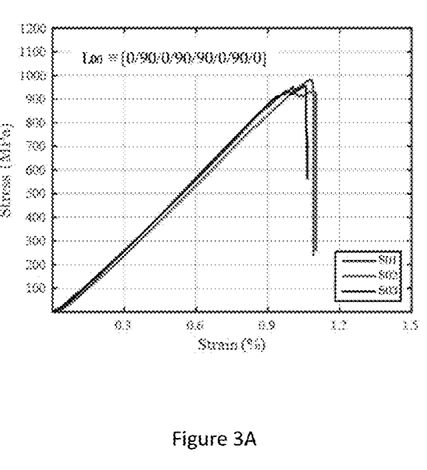
FIGS. 3A-3D. Stress-strain curves. A, baseline conventional laminate; and bio-inspired laminates with different delamination positions: B, L0; C; L04; D, L07.
Figure 3B:
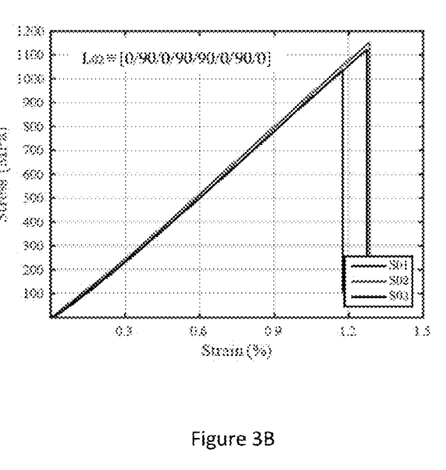
Figure 3C:
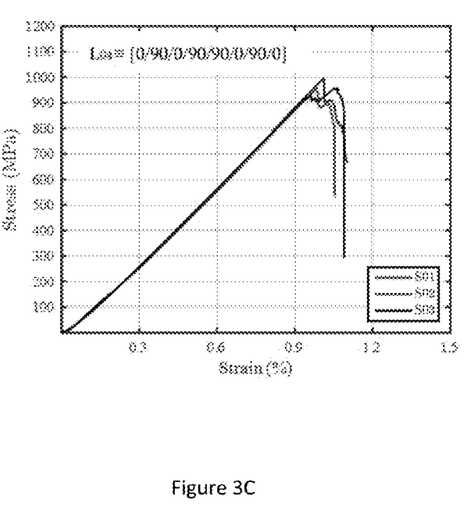
Figure 3D:
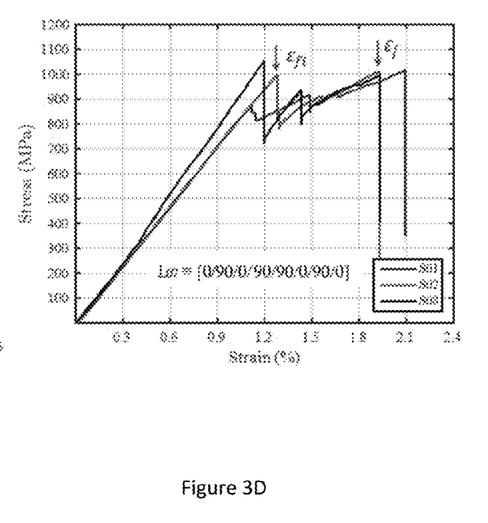

The response of L07 was different than the baseline laminate and the L02 and L04 bio-inspired laminates. For L07, the stress increases up to a local maximum value, which is almost equal to the flexural strength of the baseline L00. However, after that, a small stress drop occurs at the initiation failure strain, $\varepsilon_{fi}$. Thereafter, the stress increases again with increasing applied strain until the maximum failure strain, $\varepsilon_f$, is attained, at which point a large stress drop occurs. This stage between $\varepsilon_{fi}$ and $\varepsilon_f$ is defined as "Pseudo ductility", a stage at which the laminate shows progressive failure mechanisms similar to the yielding and strain hardening of metals, Czel et al (2018). This behavior leads to an increase in failure strain that is almost double that of the baseline laminate, while the same flexural strength is attained. Moreover, the absorbed energy is increased for this configuration compared to the baseline laminate. A summary of the flexural modulus ($E_f$), strength ($\sigma_f$), initiation ($\varepsilon_{fi}$) and failure strains ($\varepsilon_f$) and absorbed energy ($E_a$) for all the tested laminates is shown in Table 1.

TABLE 1 summary of the flexural modulus ($E_f$), strength ($\sigma_f$), initiation ($\varepsilon_{fi}$) and failure strains ($\varepsilon_f$) and absorbed energy ($E_a$) of baseline and bio-inspired laminates.

| Configuration | $E_f$ (GPa) | $\sigma_f$ (MPa) | $\varepsilon_{fi}$ (%) | $\varepsilon_f$ (%) | $E_a$ (J) |
| --- | --- | --- | --- | --- | --- |
| $L_{00}$ (Base) | 98.4 ± 1.9 | 959.1 ± 19.9 | 1.02 ± 0.05 | 1.06 ± 0.04 | 5.38 ± 0.09 |
| $L_{01}$ | 99.5 ± 0.51 | 884.9 ± 10.8 | 1.04 ± 0.17 | 1.06 ± 0.16 | 4.16 ± 0.40 |
| $L_{02}$ | 90.5 ± 0.59 | 1102.9 ± 49.4 | 1.25 ± 0.05 | 1.25 ± 0.05 | 6.66 ± 0.58 |

TABLE 1-continued summary of the flexural modulus ($E_f$), strength ($\sigma_f$), initiation ($\varepsilon_{fi}$) and failure
strains ($\varepsilon_f$) and absorbed energy ($E_a$) of baseline and bio-inspired laminates.

| Configuration | $E_f$ (GPa) | $\sigma_f$ (MPa) | $\varepsilon_{fi}$ (%) | $\varepsilon_f$ (%) | $E_a$ (J) |
|---|---|---|---|---|---|
| $L_{03}$ | 86.4 ± 2.2 | 1041.5 ± 37.9 | 1.22 ± 0.03 | 1.96 ± 0.17 | 12.97 ± 1.65 |
| $L_{04}$ | 99.3 ± 0.4 | 970.7 ± 19.4 | 0.98 ± 0.03 | 1.08 ± 0.02 | 5.39 ± 0.19 |
| $L_{05}$ | 101.8 ± 2.8 | 1010.8 ± 51.0 | 1.00 ± 0.04 | 1.06 ± 0.00 | 5.32 ± 0.11 |
| $L_{06}$ | 81.5 ± 2.0 | 793.7 ± 59.2 | 0.86 ± 0.11 | 1.43 ± 0.21 | 6.79 ± 1.57 |
| $L_{07}$ | 83.3 ± 4.3 | 1027.6 ± 18.3 | 1.24 ± 0.08 | 2.08 ± 0.08 | 13.06 ± 0.65 |
| $L_{23}$ | 86.4 ± 2.3 | 1069.1 ± 8.6 | 1.26 ± 0.04 | 1.26 ± 0.04 | 6.45 ± 0.23 |
| $L_{67}$ | 73.5 ± 1.4 | 919.8 ± 36.1 | 1.22 ± 0.53 | 1.96 ± 0.09 | 11.51 ± 1.8 |
| $L_{07\_10}$ | 87.3 ± 0.3 | 1135.6 ± 54.7 | 1.33 ± 0.05 | 2.21 ± 0.06 | 15.50 ± 0.94 |

Damage Mechanisms

Figure 4A:
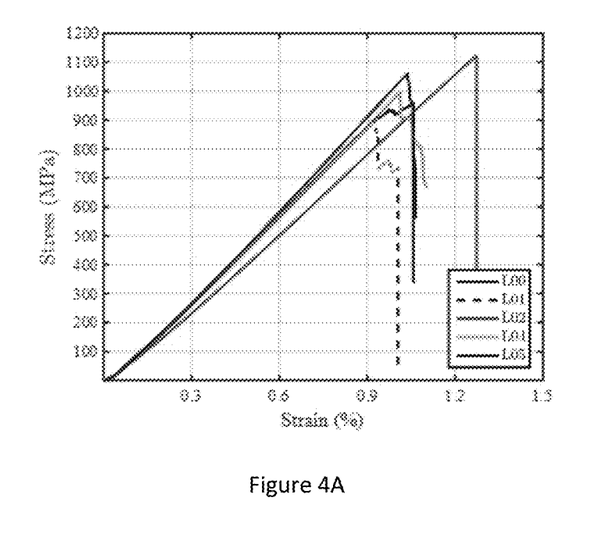
FIGS. 4A and 4B. Stress-strain curves of bio-inspired laminates with artificial delaminations at different through-the-thickness positions. A, stress-strain curves of the first group of bio-inspired laminates with similar response to the baseline; B, stress-strain curves of the first group of bio-inspired laminates with pseudo-ductile behavior.
Figure 4B:
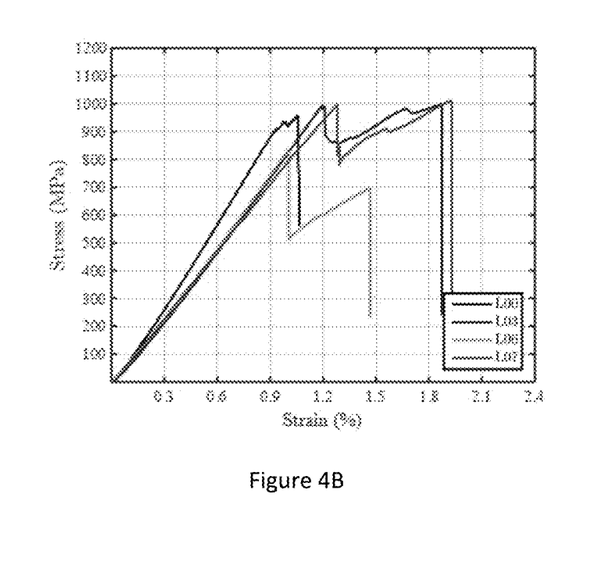
Figure 5:
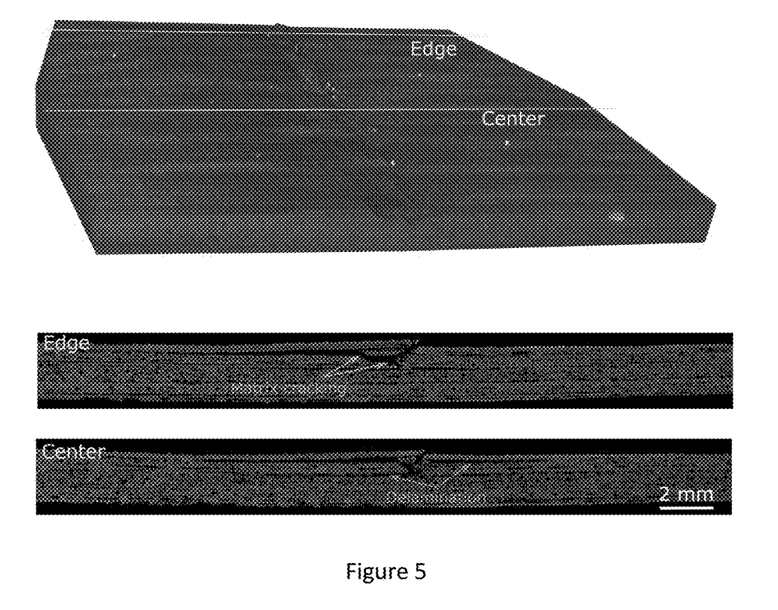
FIG. 5. 3D µCT micrograph and 2D slices at the edge and center of L00 laminate.

FIGS. 4A-B show the stress-strain response of all bio-inspired configurations which contain a single artificial delamination at different through-the-thickness positions. The considered configurations are divided into two groups. The first group includes bio-inspired composites having similar responses to the baseline laminate with improved strength/strain as shown in FIG. 4A, while the second group includes bio-inspired composites with a pseudo-ductile response, FIG. 4B. The stress-strain relation for the baseline laminate, L00, is added to both figures for better comparison. The response of L00 follows typical flexural response of CFRP laminates. First, the stress monotonically increases with increasing applied strain until damage initiation at ~900 MPa. At this stage, matrix cracks initiate and propagate at the upper part of the laminate due to the higher shear stresses caused by impact and compression, Wagih et al. (2016a). The matrix cracks usually propagate at the 90° plies where the matrix is subjected to shear stresses. When a crack propagates through a ply and reaches the interface below or above it, a delamination starts to propagate. The propagation of delamination is very rapid due to the lower interlaminar shear strength, which divides the laminate into two parts as shown in FIG. 5, and thus fibre breakage occurs at the upper part of the laminate, which is subjected to high shear stresses resulting in large stress drop as shown in FIGS. 4A-B. It is notable that the same damage mechanism is observed at the center and edges of the laminate as shown in FIG. 5.

Figure 6:
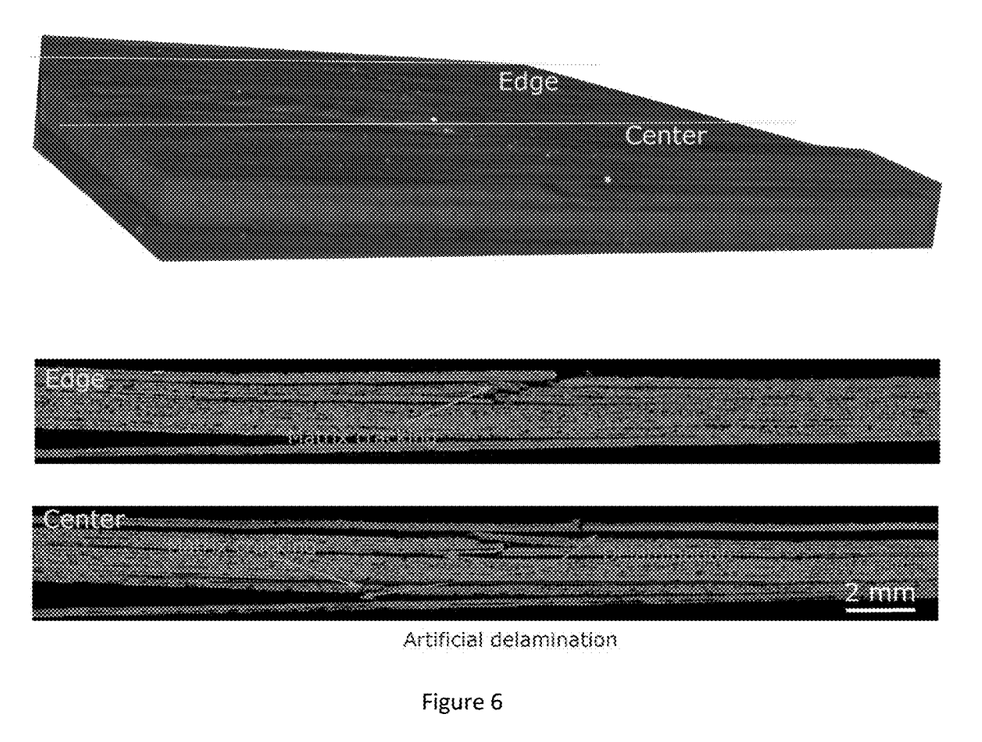
FIG. 6. 3D µCT micrograph and 2D slices at the edge and center of L02 laminate.

The damage mechanisms of L02 as an example of the first group of bio-inspired laminates is shown in FIG. 6. In the L02 bio-inspired laminate, the artificial delamination is placed at the interface between the second layer, 90°, and third layer, 0°, of the laminate. Due to the presence of this delamination, the stress concentration is located at the delamination contour which helps the generation of matrix cracks at the layer below this delamination. These cracks dissipate some energy and redistribute the stresses around the crack tip, which helps to sustain more loads. Once this layer is saturated with matrix cracks, cracks grow at the lower interface causing a fast propagation of delamination as shown in FIG. 6. At the same time, fiber breakage occurs at the upper part of the laminate due to compression, causing catastrophic failure. The failure in this case occurs throughout almost all the laminate with a higher density of delaminations compared to L00 (see FIG. 5), which causes a lower stress after the large load drop. So, in this group of bio-inspired laminates, the presence of artificial delaminations allows the generation of matrix cracks at the adjacent layers, which redistributes stresses inside the laminate and hence increases the flexural strength. The generation of these progressive damage modes, matrix cracks and delaminations increases the failure strain as well.

Figure 7A:
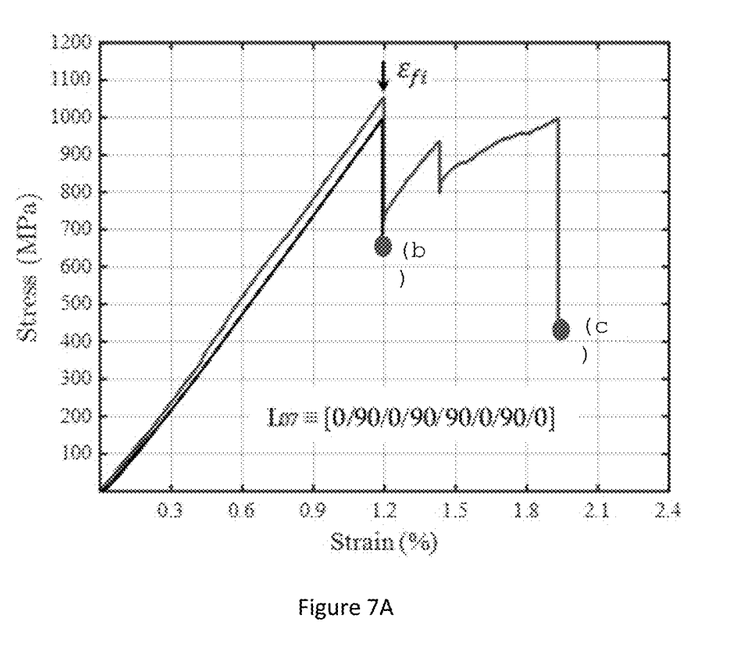
FIGS. 7A-7C. Damage mechanisms and their sequence in L07 laminate. A, stress-strain curve of L07 tested up to $\varepsilon_{fi}$ and until final failure; B, 3D µCT micrograph and 2D slices for sample tested up to $\varepsilon_{fi}$; and C, 3D µCT micrograph and 2D slices for sample tested up to complete failure.
Figure 7B:
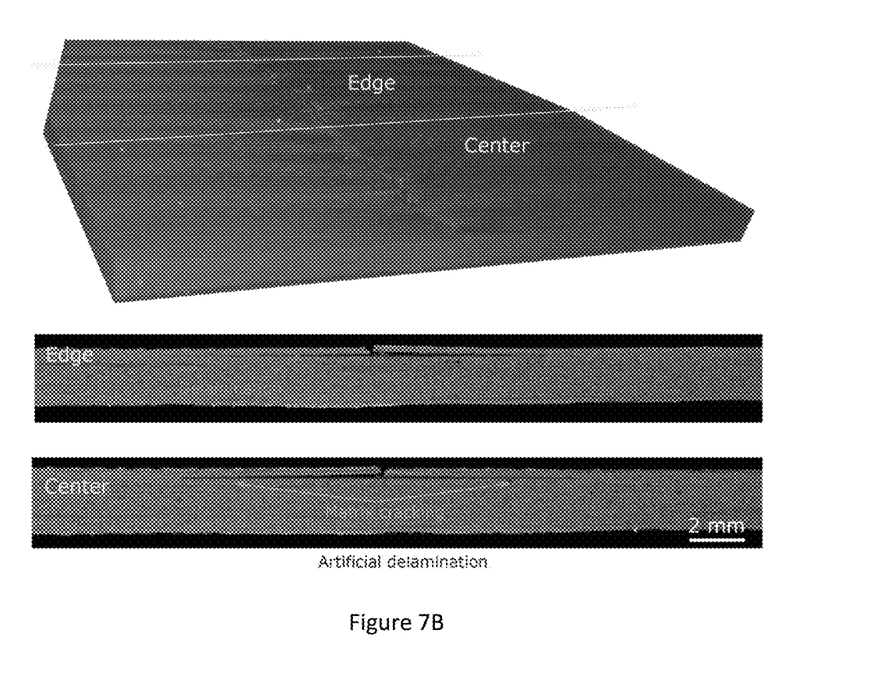
Figure 7C:
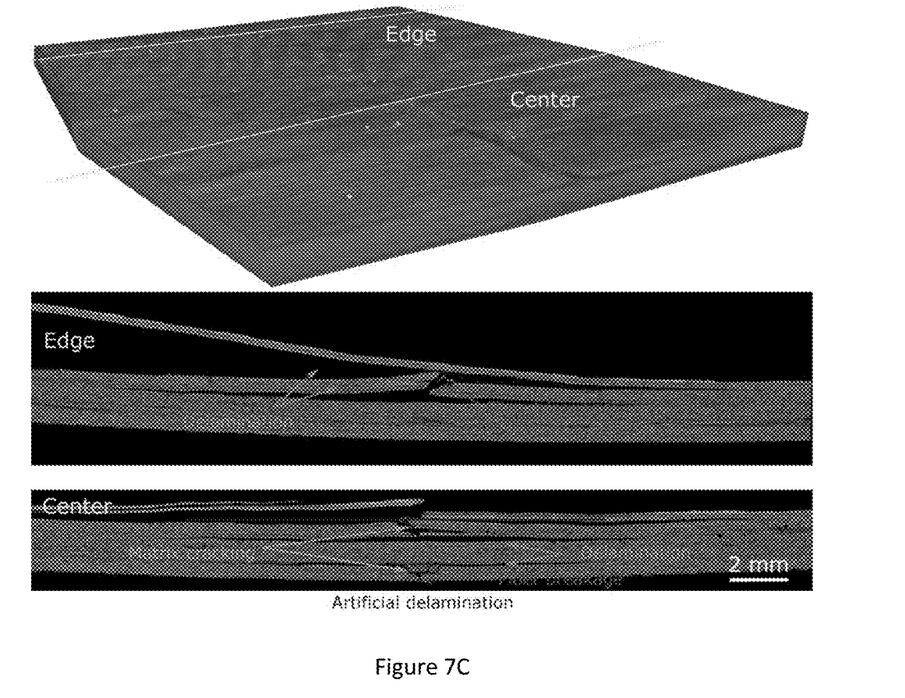

The stress-strain responses of the second bio-inspired group, L03, L06 and L07, is shown in FIG. 4B. The response of the baseline laminate, L00, is also presented for comparison. The stress-strain relation of these three bio-inspired laminates follows a linear stress increase with increasing strain up to certain strain level $\varepsilon_{fi}$, at which a small stress drop occurs. To clarify the damage mode associated with this stress drop, the test was interrupted for L07 after this stress drop (see FIG. 7A and the sample was inspected using μCT. The 3D μCT micrograph with slicing at different positions of L07 laminate tested up to $\varepsilon_{fi}$ is shown in FIG. 7B. It is observed from FIG. 7B that the stress drops in association with propagation of delamination to the edge of the samples, matrix cracking in the layer below delamination and fiber breakage in the first layer. The presence of delamination at the seventh interface, the first interface under the indenter, leads to earlier fiber breakage of the first layer, which cause a stress drop and dissipation of a large amount of applied energy. Therefore, the rest of the laminate does not suffer from any kind of damage, which allows the sublaminate to sustain more load. After the stress drop, the stress is redistributed to the sublaminate, changing the position of the higher shear stresses to the first layer of the sublaminate. This ply can sustain shear stresses again until the ultimate shear strength of the layer is attained. To reach this critical stress value, the applied strain is doubled, at which point the maximum strength is reached and a large stress drop occurs. At the large stress drop, fiber breakage and delaminations are observed everywhere in the sample as shown in FIG. 7B.

The applied strain between the $\varepsilon_{fi}$ and $\varepsilon_f$ is always known as pseudo-strain, which gives the laminate pseudo ductility. So, after an initial stress drop, the laminate can sustain loads at higher strain level. This response is analogous to the response of metals, where an initial yielding stress is first reached and then the stress can increase until the strength of the material is exceeded. Therefore, this laminate has two interesting features: the increased strength (8% larger than baseline L00) and failure strain enhancement (198% larger than baseline L00). In addition, it shows a warning sign (alert) before final failure, which make this class of bio-inspired laminates a very promising material for many different applications.

Figure 8:
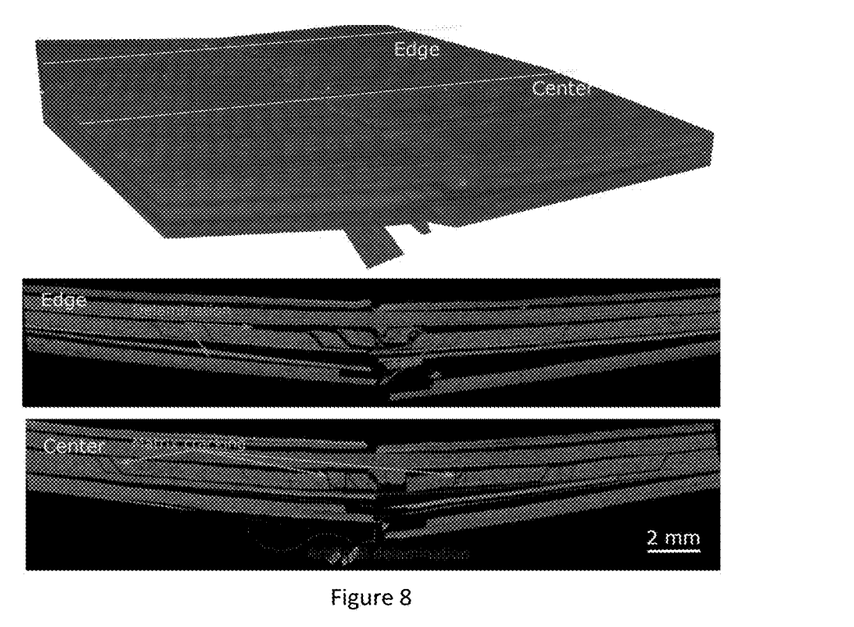
FIG. 8. 3D µCT micrograph and 2D slices at the edge and center of L03 laminate.

It is noted (see FIG. 4B), that L03 has the same stress-strain behavior and pseudo ductility response as L07. In L03, the artificial delamination is present just below the symmetry interface as shown in FIG. 8. FIG. 8 shows extensive matrix cracking at the symmetry interface and delamination propagation at the interface over the symmetry plane. The matrix cracking grows inside the symmetry interface due to the large shear stresses and the presence of the artificial delamination below it. When the cracks reach the interface over the symmetry plane a delamination propagates at this interface, which cause the small stress drop due to the separation of the laminate into two sublaminates. After this stress drop, the two sublaminates can sustain a load until the maximum strength of the fibers is attained. Therefore, this laminate shows a pseudo ductility response and a larger flexural strength (11%) and failure strain (195%) comparable to the baseline L00.

L06 shows a pseudo ductile response as well, however the strength and failure strain are lower than those of L03 and L07. This lower strength and failure strain is attribute to the location of the artificial delamination at the area of maximum interlaminer shear stress in the sample, Wagih et al. (2016a), which propagates the delamination very fast and allows fiber breakage in the upper part of the laminate. Thus, the resulting sublaminate after the first stress drop has only two layers oriented at 0°, which have lower deformability than the L07 and L03 where the sublaminate formed has 3 layers with 0°.

Figure 9A:
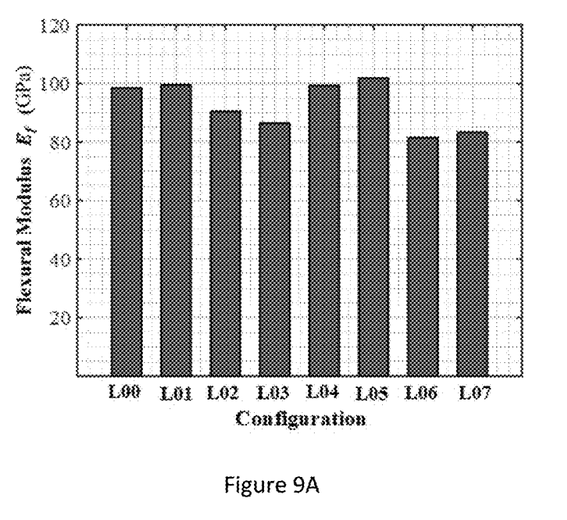
FIGS. 9A-9D. Properties of bio-inspired laminates with a single artificial delamination. A, flexural modulus; B, energy absorption; C, flexural strength; and D, strain.
Figure 9B:
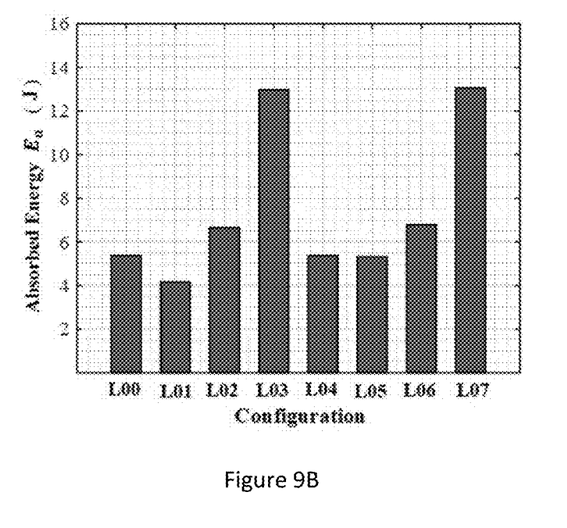
Figure 9C:
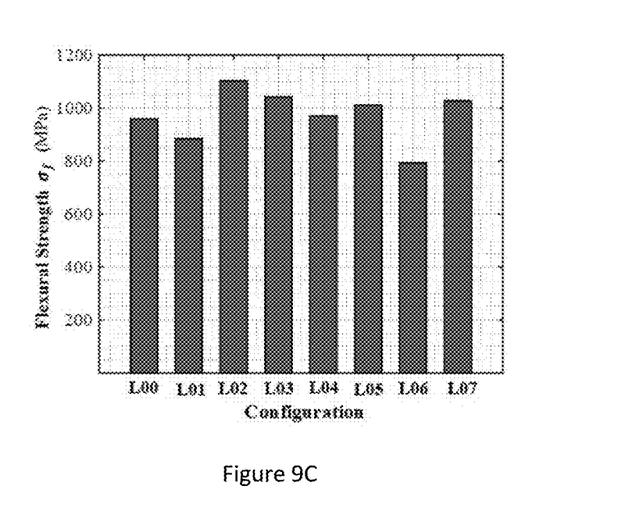
Figure 9D:
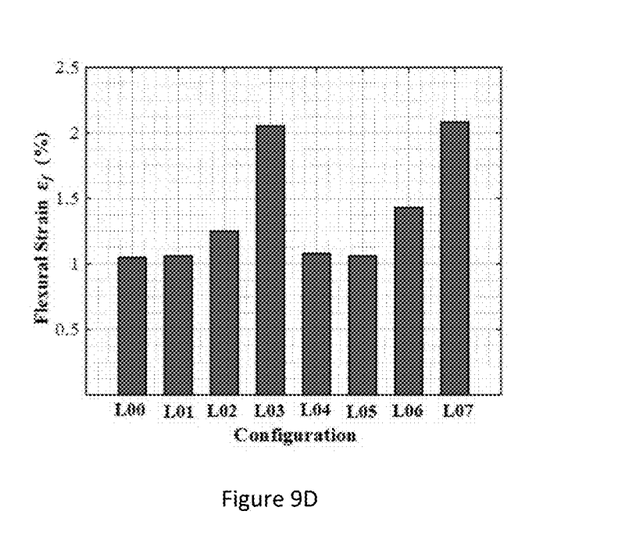

FIG. 9A-C show the summary of flexural modulus, strength, failure strain and energy absorption of all considered bio-inspired laminates with a single interface. The flexural modulus of all bio-inspired laminates is slightly lower than the baseline laminate except L04 and L05, which have a flexural modulus almost equal the modulus of the baseline laminate, see FIG. 9A. The reduction of flexural strength is not significant in almost all cases since the maximum reduction is observed for L06 with an 18.1% reduction. Interestingly, the laminates that show a pseudo ductility response with improved strength and strain, L07 and L03, shows 15% and 12% reduction. The reduction in the flexural modulus is attributed to the presence of delaminations, which allow relative movement inside the plate at the delaminated interface and hence larger deformation at defined stress level, Wagih et al. (2019& 2020).

The energy absorption ability of all the laminates is shown in FIG. 9B. It is noteworthy that the energy absorption ability of L03 and L07 is 241.1% and 243.5% larger than the baseline laminate, L00. This higher energy absorption is attributed to the pseudo ductility response of both laminates and the propagation of different damage mechanisms in a progressive manner, which dissipates more energy.

Based on these results, the properties of the presented bio-inspired laminates can be tailored by changing the position of the artificial delamination inside the laminate to meet the requirement of the designer. For instance, FIGS. 9A-C indicates that L03 shows the highest strength, 1041.5 MPa, compared to 959.1 MPa for L00. It shows also a large failure strain, 1.96%, compared to 1.06% for L00 and high-energy absorption, 12.97 J compared to 5.38 J. L07 shows the highest strain, 2.08%, and energy absorption, 13.06 J, compared to 1.06% and 5.38 J for L00, respectively. In addition, it shows a large strength, 1027.6 MPa compared to 959.1 for L00.

Defect Size Effect

Figure 10:
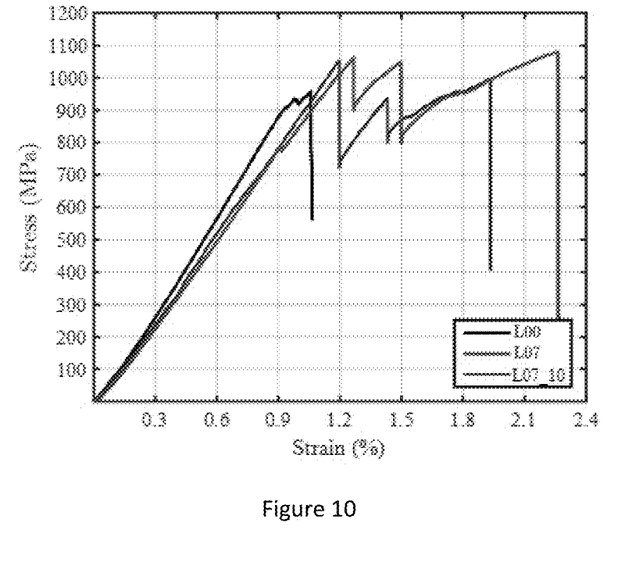
FIG. 10. Effect of delamination size on the stress-strain response of L07 bio-inspired composite.

FIG. 10 shows the stress-strain curve of L07 with two different delamination sizes, 10 and 20 mm. Decreasing the delamination size to 10 mm improves the flexural strength, strain and absorbed energy. The average flexural strength of L07 with a 10 mm delamination size (L07_10) is increased to 1135.6 MPa compared to 1027.6 MPa and 959.1 MPa for L07 with 20 mm delamination size and the baseline composite, achieving 11.1% and 11.9% improvement compared to L07 and the baseline laminate. Moreover, the failure strain is increased to 2.21% compared 2.08% and 1.06%, achieving 10.6% and 208% improvement compared to L07 and L00, respectively. Additionally, the energy absorption ability is improved by 11.6% and 288.1% compared to L07 and L00 laminates. This improved response is due to the larger area of delamination propagation in L07_10 than L07, which allows dissipation of larger energy before the initiation failure strain. Additionally, the delay of the initiation failure strain cause also a delay of the final failure strain, which results in improved strain and energy dissipation.

Figure 11A:
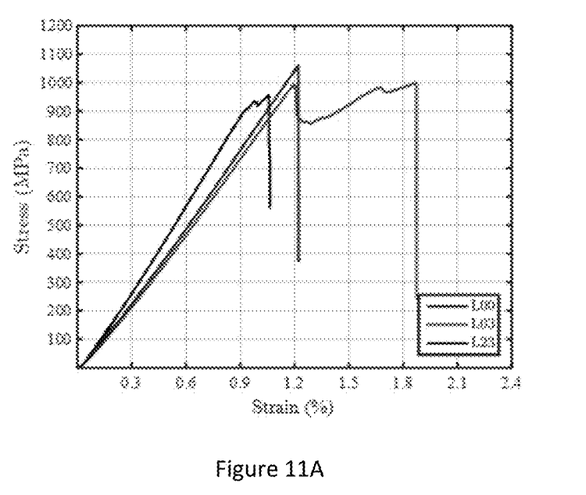
FIGS. 11A and 11B. Effect of number of delaminations on the response of pseudo ductile laminates. A, L00, L03 and L23; B, L00, L07 and L67.
Figure 11B:
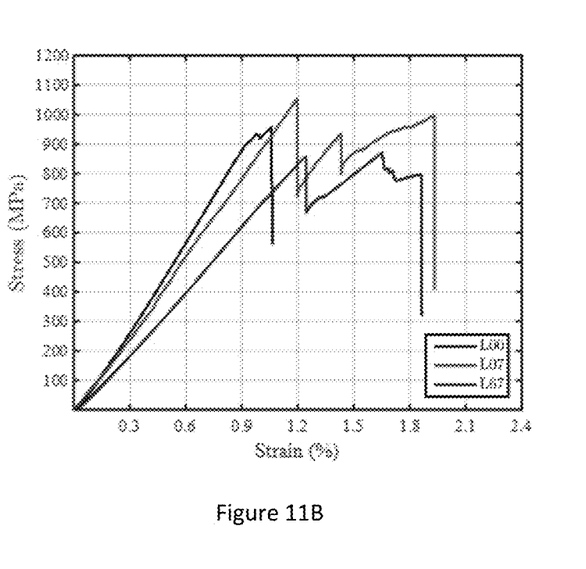

The effect of the number of delaminations on the response of the bio-inspired composites is shown in FIG. 11. In this figure, we plot the stress-strain curves of the baseline laminate, the two bio-inspired laminates with a pseudo ductility response with a single delamination, L03 and L07, and the bio-inspired laminates with two elliptical delaminations at the third and second interface for L23 and the seventh and sixth interfaces for L67. The delamination shape in this case is elliptical with 20 mm projected delamination diameter, where the delamination major axis follows the orientation of the ply below the delamination. As shown in FIG. 11, adding one delamination at the second interface, changed the response to be more like the L02 laminate response with improved strength and strain. However, the pseudo ductility response of L03 disappears due to the presence of delamination at the second interface. Unlike adding delamination at the sixth interface for L07, the pseudo ductility response can be attained while maintaining a very larger failure strain; however, the maximum strength is reduced due to the presence of delamination at the sixth interface where the maximum interlaminer shear stresses occur, which makes the damage initiate at this interface instead of the seventh interface for L07. The damage mechanism that is associated with propagation of matrix cracks and fiber breakage of the first layer started a bit later than L07, resulting in a larger initiation failure strain.

It is noteworthy that we selected the elliptical shape delamination with alignment of the major axis to be analogues of the delamination shape in composite laminates after impact, Wagih et al. (2016a,b, 2019). Usually low velocity impacts cause delaminations at a certain energy level. Based on our results, these delaminations can be beneficial for strain and strength after impact if the position of the delamination can be controlled. The control of the through the thickness position of delamination is a challenging issue. However, some researchers have shown that they partially controlled the delamination position by using unsymmetrical stacking sequences and thick ply laminates [Wagih et al 2019]. These results provide a guide for composite laminate designers to design their laminates in such a way so as to allow delamination propagation at the interface near the indenter and inhibit delaminations at other locations, resulting in improved flexural strength and strain after impact.

CONCLUSIONS

As demonstrated above, different designs of bio-inspired composite laminates are proposed. All laminates tested were made of UD carbon/epoxy plies using a cross ply stack sequence; however, the results provide a more general demonstration of prepregs and the use of preselected delamination zones or defects at one or more locations in the x, y, and z dimensions of composites formed therefrom. Artificial defects with different sizes and numbers were embedded at different positions through the thickness of the laminate center. A three-point bending test was used to characterize the flexural properties of the bio-inspired composite laminates. The μ-CT was used to identify the different damage mechanisms inside the tested specimens. It was found that the number of artificial defects, size and through-the-thickness position affected the mechanical behavior of the bio-inspired composite laminate. The results demonstrated:

i) Embedding artificial delaminations at different through-the-thickness positions of the laminate during the lamination process changes the damage modes and their sequence during flexural testing, providing laminates with a pseudo ductile response and improved strength and energy absorption ability in some configurations. Composites may be formed with one delamination in the Z dimension from the top or bottom surface of the composite, or with more than one delamination. The delaminations may be any desired size and shape including circular, ellipsoid, square, or a free form shape. When one more than one delamination is present they may be positioned on the same Z dimension as other delaminations, or at different Z dimensions. In addition, when two or more delaminations are present in a composite, they may be aligned on the Z axis or not aligned.

ii) The delamination through-the-thickness position is the parameter that most affects the response of the bio-inspired laminates. Laminates with at least one delamination area at the nearest interface to the indenter showed the greatest improvement of strength, strain and energy absorption. For example, in a composite formed from a multi ply laminate of four, five, six, seven, eight, nine, or ten or more plies, having the delamination between the first and second ply from the top or bottom surface, or between the second and third ply from the top or bottom surface is preferred.

iii) The delamination size also contributes the improvement rates, where a smaller delamination size results in better properties than a larger size. For example, in a composite formed from a multi ply laminate of four, five, six, seven, eight, nine, or ten or more plies, having the delamination have a diameter or major axis of greater than 2 mm but less than 20 mm is preferred, and having the diameter or major axis of greater than 5 mm but less then 15 mm is more preferred, and excellent results can be achieved when the diameter or major axis of the delamination is 10 mm±1 mm. In an exemplary test composite, the strength, failure strain and energy absorption ability of a laminate with a 10 mm delamination diameter located at the nearest interface to the indenter are 11.9%, 208% and 288.1% larger than the baseline laminate, respectively.

iv) Inclusion of delaminations in composites formed from multi ply laminates of four, five, six, seven, eight, nine, or ten or more plies, results in surface cracking appearing on a top or bottom surface well before final failure, while also having improvements in terms of handling stress and strain. This solves a long-standing problem with composites in that, previously, their would be no sign of problems with parts made from them until catastrophic failure suddenly occurs. The invention allows for the production of parts which will show damage but maintain strength so that operators of the structures in which these composites are used (e.g., aircraft, oil drilling pipes, ships, cars, etc.) will be provided adequate time to recognize and replace damaged parts before failure.

The strategies and results described herein permit composite laminate designers to design laminates in a way that allows delamination propagation at the interface near an indenter (i.e. a location of impact) and prevent delaminations at other locations, resulting in improved flexural strength and strain after impact.

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

STATEMENT OF SUPPORT

This project was funded by the Science and Technology Unit (STU), at King Abdulaziz University, Jeddah, Saudi Arabia, under grant no. (UE-41-102). The authors, therefore, acknowledge with thanks STU for technical and financial support

We claim:

1. A method of making a carbon fiber reinforced polymer (CFRP) composite laminate, comprising
    forming a lay-up comprising four or more plies of prepreg tapes, wherein the prepreg tapes comprise resin and carbon fiber, wherein the lay-up has a top and a bottom surface;
    positioning at least one substance that is not fusible with the resin at at least one interface between at least two of the plys of the four or more plys; and
    applying heat and pressure sufficient to fuse the resin in the four or more plys of prepreg tapes together except at the location of the of the at least one substance to form a laminate with a delamination between the at least two of the plys, wherein the delamination has a size which ranges from 50 to about 500 mm$^2$.

2. The method of claim 1 wherein positioning occurs either between a first and a second ply of the four or more plies from either a top or a bottom surface or between the second and a third ply of the four or more plies from either the top or the bottom surface.

3. The method of claim 2 wherein the lay-up has at least 10 plys.

4. The method of claim 2 wherein the delamination has a diameter or major axis of greater than 2 mm but less than 20 mm.

5. The method of claim 4 wherein the diameter or major axis ranges from 9 mm to 11 mm.

6. The method of claim 1 wherein positioning occurs between a first and a second ply of the four or more plies from either a top or a bottom surface.

7. The method of claim 6 wherein the lay-up as at least 10 plys.

8. The method of claim 7 wherein the delamination has a diameter or major axis of greater than 2 mm but less than 20 mm.

9. The method of claim 8 wherein the diameter or major axis ranges from 9 mm to 11 mm.

10. The method of claim 1, wherein the prepreg tapes are carbon/epoxy unidirectional (UD) prepreg tapes.

11. The method of claim 1, wherein the at least one substance is polytetrafluoroethylene.

12. The method of claim 1, wherein the at least one substance is shaped as a circle, ellipsoid, square or rectangle.

13. The method of claim 1 wherein the positioning step places a plurality of substances that are not fusible with the resin at a plurality of interfaces between at least two of the plies of the four or more plies, wherein the at least two of the plies are different for each of the plurality of resins.

14. The method of claim 13 wherein the plurality of substances are aligned in a Z dimension of the layup.

15. The method claim 13 wherein the plurality of substances are not aligned in a Z dimension of the layup.

16. The method of claim 1, wherein the lay-up is cross-ply, isotropic, quasi-isotropic or anisotropic.

17. The method of claim 1 wherein the lay-up is cross-ply, and wherein a pseudo ductile response is achieved.

* * * * *